March 1, 1932.  T. STENHOUSE  1,847,276

GLASS FEEDER

Filed Jan. 14, 1929

INVENTOR.
Thomas Stenhouse
BY Eccleston & Eccleston
ATTORNEYS.

Patented Mar. 1, 1932

1,847,276

UNITED STATES PATENT OFFICE

THOMAS STENHOUSE, OF WASHINGTON, PENNSYLVANIA, ASSIGNOR TO HAZEL-ATLAS GLASS CO., OF WHEELING, WEST VIRGINIA

GLASS FEEDER

Application filed January 14, 1929. Serial No. 332,374.

My invention relates to a new and improved apparatus for forming glass charges, and one of the objects of the invention is to provide a feeding device which will accurately control the shapes and weights of the charges, but does not require any reciprocation of the controlling implement, which often results in the breakage of the implements.

Another object of the invention is to provide means whereby the controlling implement may be revolved in a fixed but variable plane.

Another advantage of the invention resides in the provision of a new and improved means for regulating the flow of glass through the flow orifice.

Various other advantages of the invention will be apparent to those skilled in the art, from the following description. Mechanical glass feeders have been in common use for a great many years, and many different types have been and are being used; but as far as I know, it is broadly new to employ a non-reciprocating plug which projects through the orifice and is adapted to give a controlled shape to the charges. And it is also believed to be broadly new to provide a rotatable but non-reciprocable plug of this character. The construction of the device, its advantages, and its mode of operation will now be described, reference being had to the accompanying drawings; in which Figure 1 is a front view of the apparatus; the flow spout being shown in section.

Figure 1:
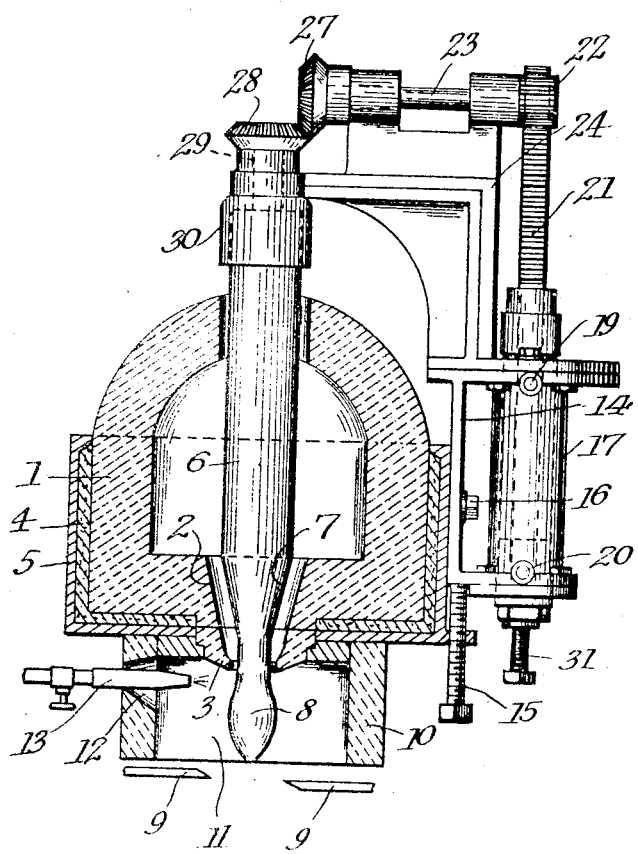
Figure 2:
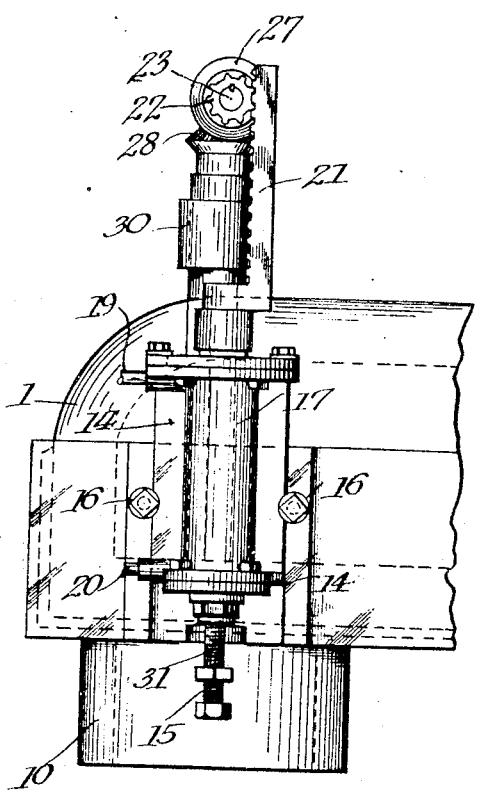
Figure 2 is a side view of the apparatus.

Referring to the drawings more in detail, numeral 1 indicates the conventional refractory flow spout which communicates with the glass furnace and through which the glass flows to the outlet or flow orifice 2. The wall of the flow orifice converges downwardly and terminates in an inwardly curved bushing 3 of refractory material. The flow spout is surrounded with the usual insulating material 4; and the metal casing 5, which is attached to the glass furnace (not shown), supports the spout and its insulating material.

The feed control implement is indicated by numeral 6, and this implement is centrally arranged within the flow orifice 2 and extends through and below the same. The part of the implement within the flow orifice is tapered, as indicated by numeral 7, in substantial accordance with the taper of the orifice wall, but leaving an annular channel about the implement, through which the glass flows. By vertically adjusting the implement the size of this channel may be increased or decreased as desired, whereby the volume of flowing glass and hence the weight of the charges, is accurately controlled.

The part of the implement at the outlet end of the flow orifice is preferably substantially cylindrical; but the part 8 projecting below the outlet is swelled out and then tapers to a rounded point; having in general a sort of bulbous shape. I have described here the particular shape of the projecting portion as illustrated in the drawings, but it is to be understood that this is varied in practice in accordance with the article that is being made or the form of charge that is desired. As will be described hereinafter, the glass flows over this bulbous end and forms into a charge beneath it; the charges being severed while they are still suspended or after they have been deposited in the molds (not shown), by the shears 9 which are constructed in accordance with the established practice and are therefore merely illustrated diagrammatically. It is to be noted that the shears are arranged in close proximity to the lower tip of the feed control implement, so that the charge will be severed at a point very close to the end of the implement.

By reason of the fact that the implement projects below the orifice, I am enabled to bathe the oncoming glass and the sheared portion, in a heating flame, by which the surface tension may be modified and rendered more or less fluid, thereby furnishing an additional means of control. With this object in view a refractory wall 10 surrounds that portion of the implement which extends below the orifice, and this wall extends downwardly to a point adjacent the shears, forming a reverberating chamber 11. The wall 10 is provided with an opening 12 in which is arranged a burner 13 for projecting the flame into the chamber. Of course, the angle of the burner and the intensity of the flame are regulable. I have indicated only one port 12, as being adequate for use with a rotating implement, but any number may be employed; and a plurality of such ports is especially desirable when the feeder is employed without the rotation of the implement.

I shall now describe the apparatus for rotating the implement and for adjusting it.

A bracket 14 is slidably mounted on the side of the metal casing, and is vertically adjusted by means of set screw 15; the bracket being retained in position by the cap screws 16. A cylinder 17 is mounted on the bracket 14, and is provided at the top and bottom with the usual air connections 19 and 20, respectively, which lead to a source of air under pressure; the admission and exhaust of the air pressure being controlled by the ordinary timing valves, operated in synchronization with the forming machine, which have been in common use for many years and are therefore not illustrated. Also in accordance with the usual practice, volume control valves (not shown) are preferably provided in the air lines, adjacent the cylinder.

The cylinder is provided with the usual piston and piston rod; and to the upper end of the piston rod is attached a rack 21 meshing with a gear wheel 22 keyed to a shaft 23, journaled in the bracket 24. Keyed to the opposite end of the shaft 23 is a mitre gear 27 meshing with a mitre gear 28 fixed to the shaft extension 29 of the implement holder 30; the implement being detachably mounted in the holder by any of the well known means.

Threaded through the lower cylinder head, and projecting upwardly into the cylinder 17, is a rod 31. This rod limits the movement of the piston; and the extent of movement of the piston is varied by adjusting the rod, an ordinary lock-nut maintaining the rod in its adjusted position.

Figure 3:
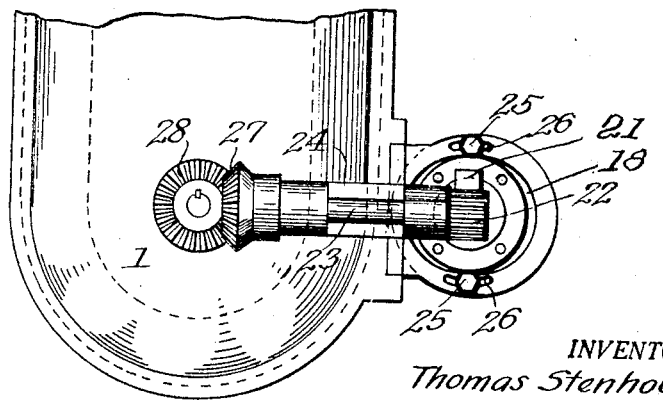
Figure 3 is a top plan view thereof.

I have also provided means by which the implement 6 is accurately centered in the flow orifice. This is accomplished by the arcuate and lateral adjustment of the bracket 24 which carries the implement and the driving shaft 23. By reference to Figure 3 it will be noted that the bracket 24 may be arcuately adjusted by means of the arcuate slots 26 and bolts 25. This arcuate adjustment of the bracket gives a slight backward or forward adjustment to the implement, to center it, in that direction, in the flow orifice. It will also be noted that the base of bracket 24 is provided with an oval opening 18, which permits the bracket to be adjusted laterally, to thereby adjust the implement transversely of the spout, to center it therein, in that direction. It will be understood that the arcuate slots 26 are somewhat wider than the diameter of the bolts 25; there being sufficient play thus provided to permit the lateral adjustment. Of course, the pinion 22 is of such width that it will remain in mesh with the rack 21, when the bracket is adjusted.

The operation of the feeder will now be briefly described.

Glass from the tank is allowed to flow into the spout until it has reached the desired level. The feed control implement 6 is adjusted vertically to permit the desired flow of glass through the annular space between the implement and the wall of the flow orifice. The regulation of this space, by the vertical adjustment of the implement, by means of set screw 15 and cap screws 16, will control the volume of glass flowing downward onto the end of the implement, and will thus control the weight of the charges.

Fluid pressure is alternately admitted to and exhausted from the ends of cylinder 17, in timed relation with the operation of the forming machine. The rack 21 is thus reciprocated, and this reciprocating movement is employed to impart a rotary movement, in opposite directions, to the feed control implement 6, by means of the intermediate gearing. The extent of reciprocation of the rack, and hence the extent of rotary movement of the implement for each cycle of operation, is varied by adjusting the threaded rod 31; and the velocity of rotation, in either direction, may be varied by the adjustment of volume control valves (not shown) in the air lines 19 and 20.

The device having been set in motion, and properly adjusted, the glass flows through the orifice, downwardly along the implement in an annular stream, and over the bulbous end, from which it depends in the desired form of mold charge, to be severed by the shears 9, which are operated in the usual manner in synchronism with the forming machine and feeder. It will be understood that the lower part of the implement, over which the glass flows, forms a core, and provides sufficient frictional tension to support the glass charge. The lower end of the implement may be of any desired size and shape, and different sizes and shapes may be employed in connection with the manufacture of articles of widely different weights, sizes, or shapes.

The rotation of the implement insures a charge of uniform temperature throughout; and to some extent the shape and weight of the charges may be controlled by the extent and speed of rotation; but it is to be understood that the invention is not limited to a rotating implement. When it is desired to stop the rotation, and employ the device with a stationary implement, it is only necessary to render the cylinder 17 inoperative by shutting off the supply of fluid pressure thereto.

As stated hereinbefore the charges may be severed while in suspension or after they have been deposited in the molds; but in either case, and whether the implement is stationary or rotated, it is desirable to sever the charges close to the tip of the implement; and when thus severed close to the tip, the surface tension of the remaining stub, due to the chilling effect of the shears, will cause the stub to move slightly upward or at least momentarily hesitate in its downward movement; thus giving the desired interval between the severance of one charge and the commencement of formation of the succeeding charge.

Also, whether the feeder is employed with a stationary or a rotating implement, I preferably bathe the oncoming glass, the charges, and the remaining stubs, in a heating flame, thereby modifying the surface tension; and by varying the intensity of the flame and hence the degree of surface tension, I am able to further control the charges.

While I have described the apparatus in detail, it is obvious that the invention may be modified and changed in various respects; and all such changes and modifications I aim to include in the scope of the appended claims.

Having fully described the invention, what I claim is:

1. A glass feeder including a flow spout having a flow orifice in the bottom thereof, a non-reciprocating feed control implement projecting downwardly through the orifice and extending a substantial distance below the orifice, the wall of said orifice converging downwardly, the portion of the implement within the orifice tapering downwardly to form an annular channel between the implement and the wall of the orifice, means for vertically adjusting the implement to vary the size of the channel and thereby vary the volume of glass flowing therethrough, the lower end of the implement being enlarged to control the shape of the charges, and shears arranged below the implement for severing the charges.

2. A glass feeder including a flow spout having a flow orifice in the bottom thereof, a non-reciprocating feed control implement projecting downwardly through the orifice and extending a substantial distance below the orifice, the wall of said orifice converging downwardly, the portion of the implement within the orifice tapering downwardly to form an annular channel between the implement and the wall of the orifice, means for vertically adjusting the implement to vary the size of the channel and thereby vary the volume of glass flowing therethrough, the lower end of the implement being enlarged to control the shape of the charges, means for surrounding the projecting portion of the implement with a heating flame, and shears for severing the charges formed at the lower end of the implement.

3. A glass feeder including a flow spout having a flow orifice in the bottom thereof, a rotary non-reciprocating feed control implement projecting downwardly through the orifice and extending a substantial distance below the orifice, and shears for severing the charges formed at the lower end of the orifice.

4. A glass feeder including a flow spout having a flow orifice in the bottom thereof, a rotary non-reciprocating feed control implement projecting through the orifice and extending a substantial distance below the orifice, the portion of the implement within the orifice being shaped to cooperate with the orifice wall to form a channel, means for vertically adjusting the implement to vary the size of the channel, and shears arranged beneath the implement to sever the charges.

5. A glass feeder including a flow spout having a flow orifice in the bottom thereof, a rotary non-reciprocating feed control implement projecting through the orifice and extending a substantial distance below the orifice, the portion of the implement within the orifice being shaped to vary the volume flow of glass by vertical adjustment of the implement, means for vertically adjusting the implement, means for surrounding the projecting portion of the implement with a heating flame, and shears arranged below the implement.

6. A glass feeder including a flow spout having a flow orifice in the bottom thereof, a rotary non-reciprocating feed control implement projecting through the orifice and extending a substantial distance below the orifice, the portion of the implement within the orifice being shaped to vary the volume flow of glass by vertical adjustment of the implement, means for vertically adjusting the implement, means for projecting a heating flame against the glass on the projecting portion of the implement, and shears arranged below the implement.

THOMAS STENHOUSE.